United States Patent
Depraete et al.

(10) Patent No.: US 9,441,718 B2
(45) Date of Patent: Sep. 13, 2016

(54) HYDROKINETIC TORQUE COUPLING DEVICE HAVING TURBINE-PISTON LOCKUP CLUTCH, AND RELATED METHODS

(71) Applicant: VALEO EMBRAYAGES, Amiens (FR)

(72) Inventors: Alexandre Depraete, Bloomfield, MI (US); Michel Bacher, Marseilles (FR)

(73) Assignee: Valeo Embrayages (FR)

( * ) Notice: Subject to any disclaimer, the term of this patent is extended or adjusted under 35 U.S.C. 154(b) by 140 days.

(21) Appl. No.: 14/522,263

(22) Filed: Oct. 23, 2014

(65) Prior Publication Data

US 2016/0116037 A1    Apr. 28, 2016

(51) Int. Cl.
*F16H 45/02*    (2006.01)

(52) U.S. Cl.
CPC ....... *F16H 45/02* (2013.01); *F16H 2045/0205* (2013.01); *F16H 2045/0226* (2013.01); *F16H 2045/0263* (2013.01); *F16H 2045/0278* (2013.01)

(58) Field of Classification Search
CPC ........... F16H 45/02; F16H 2045/0205; F16H 2045/0273; F16H 2045/0278
See application file for complete search history.

(56) References Cited

U.S. PATENT DOCUMENTS

| | | |
|---|---|---|
| 2,130,895 A | 9/1938 | Ness |
| 2,860,747 A | 11/1958 | Kelley |
| 2,992,713 A | 7/1961 | Stump et al. |
| 3,041,892 A | 7/1962 | Schjolin |
| 3,252,352 A | 5/1966 | General et al. |
| 4,041,701 A | 8/1977 | Goto et al. |
| 4,153,147 A * | 5/1979 | Chana ............ F16H 45/02 192/3.28 |
| 4,194,604 A * | 3/1980 | Nichols .......... F16H 45/02 192/3.26 |
| 5,713,442 A | 2/1998 | Murata et al. |
| 5,813,505 A | 9/1998 | Olsen et al. |
| 6,915,886 B2 | 7/2005 | Dacho et al. |

(Continued)

FOREIGN PATENT DOCUMENTS

| | | |
|---|---|---|
| DE | 1550957 A1 | 7/1969 |
| DE | 2245901 A1 | 4/1974 |

(Continued)

OTHER PUBLICATIONS

Lindemann et al., "iTC—Innovative Solutions for Torque Converters Pave the Way into the Future", Torque Converter 20, pp. 280-301.

(Continued)

*Primary Examiner* — Jacob S Scott
(74) *Attorney, Agent, or Firm* — Berenato & White, LLC

(57) ABSTRACT

A hydrokinetic torque coupling device features a casing including an impeller shell, a casing shell, and an intermediate casing component connecting the impeller and casing shells. The intermediate casing component includes a casing wall portion and a piston engagement portion extending inward from and being non-rotatable relative to the casing wall portion. The device further features an impeller including the impeller shell. The turbine-piston is coaxially aligned with and hydrodynamically drivable by the impeller, and includes a turbine-piston shell having a turbine-piston flange with an engagement surface that is movable axially toward and away from an engagement surface of the piston engagement portion to position the hydrokinetic torque coupling device respectively into and out of a lockup mode.

20 Claims, 5 Drawing Sheets

(56) References Cited

U.S. PATENT DOCUMENTS

| | | |
|---|---|---|
| 7,191,879 B2 | 3/2007 | Arhab et al. |
| 7,445,099 B2 | 11/2008 | Maucher et al. |
| 8,276,723 B2 | 10/2012 | Verhoog et al. |
| 2003/0168298 A1 | 9/2003 | Holler et al. |
| 2003/0168299 A1 | 9/2003 | Holler et al. |
| 2004/0011032 A1 | 1/2004 | Holler et al. |
| 2006/0086584 A1 | 4/2006 | Maucher et al. |
| 2008/0277227 A1* | 11/2008 | Jameson ............ F16H 45/02 192/3.33 |
| 2013/0230385 A1 | 9/2013 | Lindemann et al. |
| 2014/0014454 A1 | 1/2014 | Davis |
| 2014/0014455 A1 | 1/2014 | Davis |
| 2014/0097055 A1 | 4/2014 | Lindemann et al. |
| 2014/0110207 A1 | 4/2014 | Davis |

FOREIGN PATENT DOCUMENTS

| | | |
|---|---|---|
| DE | 10226860 A1 | 12/2003 |
| EP | 0125428 A1 | 11/1984 |
| FR | 668839 A | 11/1929 |
| FR | 2317556 A1 | 2/1977 |
| FR | 2428188 A1 | 1/1980 |
| FR | 2561342 A1 | 9/1985 |
| FR | 2736982 A1 | 1/1997 |
| FR | 2787854 A1 | 6/2000 |
| JP | 58-131466 A | 8/1983 |
| KR | 101311531 B1 | 9/2013 |
| WO | 2004046574 A1 | 6/2004 |

OTHER PUBLICATIONS

U.S. Appl. No. 14/510,244, filed Oct. 9, 2014, First Named Inventor: Alexandre Depraete.
U.S. Appl. No. 14/510,267, filed Oct. 9, 2014, First Named Inventor: Alexandre Depraete.
U.S. Appl. No. 14/522,189, filed Oct. 23, 2014, First Named Inventor: Alexandre Depraete.
U.S. Appl. No. 14/522,302, filed Oct. 23, 2014, First Named Inventor: Alexandre Depraete.
U.S. Appl. No. 14/522,333, filed Oct. 23, 2014, First Named Inventor: Alexandre Depraete.
U.S. Appl. No. 14/522,361, filed Oct. 23, 2014, First Named Inventor: David Werthman.
U.S. Appl. No. 14/522,372, filed Oct. 23, 2014, First Named Inventor: Alexandre Depraete.
U.S. Appl. No. 14/522,393, filed Oct. 23, 2014, First Named Inventor: Alexandre Depraete.
U.S. Appl. No. 14/561,961, filed Dec. 5, 2014, First Named Inventor: Alexandre Depraete.
U.S. Appl. No. 14/562,022, filed Dec. 5, 2014, First Named Inventor: Alexandre Depraete.
U.S. Appl. No. 14/562,064, filed Dec. 5, 2014, First Named Inventor: Alexandre Depraete.
U.S. Appl. No. 14/562,099, filed Dec. 5, 2014, First Named Inventor: Alexandre Depraete.
U.S. Appl. No. 14/562,136, filed Dec. 5, 2014, First Named Inventor: Alexandre Depraete.
U.S. Appl. No. 14/562,216, filed Dec. 5, 2014, First Named Inventor: Sungchul Lee.
U.S. Appl. No. 14/562,253, filed Dec. 5, 2014, First Named Inventor: Alexandre Depraete.
U.S. Appl. No. 14/562,286, filed Dec. 5, 2014, First Named Inventor: Alexandre Depraete.
U.S. Appl. No. 14/687,602, filed Apr. 15, 2015, First Named Inventor: Alexandre Depraete.

* cited by examiner

HYDROKINETIC TORQUE COUPLING DEVICE HAVING TURBINE-PISTON LOCKUP CLUTCH, AND RELATED METHODS

BACKGROUND OF THE INVENTION

1. Field of the Invention

The present invention generally relates to hydrokinetic torque coupling devices, and more particularly to a hydrokinetic torque coupling device including a turbine-piston lockup clutch for mechanically coupling driving and driven shafts.

2. Description of the Related Art

Generally, vehicles with automatic transmissions are equipped with a hydrokinetic torque coupling device for fluidly coupling the driving shaft of an engine to a driven shaft of a transmission. Lockup clutches are known for mechanically coupling the driving and driven shafts under certain operating conditions. Lockup clutches and their operation are described in, for example, U.S. Pat. Nos. 8,276,723 and 7,191,879.

While hydrokinetic torque coupling devices with lockup clutches have proven to be useful for vehicular driveline applications and conditions, improvements that may enhance their performance and cost are possible.

As taught hereinbelow, such improvements may derive from, for example, reducing the spatial requirements of components of the hydrokinetic torque coupling device and/or consolidating functions of two or more components into a single component.

BRIEF SUMMARY OF THE INVENTION

According to a first aspect of the invention, there is provided a hydrokinetic torque coupling device for coupling together a driving shaft and a driven shaft. The hydrokinetic torque coupling device includes a casing rotatable about a rotational axis, an impeller coaxially aligned with the rotational axis and including an impeller shell, and a turbine-piston coaxially aligned with and hydrodynamically drivable by the impeller. The casing includes the impeller shell, a casing shell situated axially opposite the impeller shell, and an intermediate casing component. The intermediate casing component includes a casing wall portion and a piston engagement portion extending inward from and non-rotatable relative to the casing wall portion. The casing wall portion is situated between and fixedly interconnects the impeller shell and the casing shell. The piston engagement portion has a first engagement surface. The turbine-piston includes a turbine-piston shell having a turbine-piston flange with a second engagement surface that is movable axially toward and away from the first engagement surface of the piston engagement portion to position the hydrokinetic torque coupling device respectively into and out of a lockup mode in which the turbine-piston is mechanically locked with so as to be non-rotatable relative to the piston engagement portion of the casing.

According to a second aspect of the present invention, a method is provided of assembling a hydrokinetic torque coupling device for coupling a driving shaft and a driven shaft together. A torque converter includes an impeller having an impeller shell, and a turbine-piston having a turbine-piston shell with an axially movable turbine-piston flange. The impeller shell of the torque convener is connected with an intermediate casing component including a casing wall portion and a piston engagement portion having a first engagement surface to provide a structure in which the turbine-piston flange has a second engagement surface that is movable axially toward and away from the first engagement surface of the piston engagement portion of the intermediate casing component to position the hydrokinetic torque coupling device respectively into and out of a lockup mode in which the turbine-piston is mechanically locked with so as to be non-rotatable relative to the piston engagement portion of the intermediate casing component. A casing shell is non-rotatably connected to the intermediate casing component.

A third aspect of the invention provides a method of coupling a driving shaft and a driven shaft together with a hydrokinetic torque coupling device. The hydrokinetic torque coupling device includes a casing rotatable about a rotational axis, an impeller coaxially aligned with the rotational axis and including an impeller shell, and a turbine-piston coaxially aligned with and hydrodynamically drivable by the impeller. The casing includes the impeller shell, a casing shell situated axially opposite the impeller shell, and an intermediate casing component including a casing wall portion and a piston engagement portion extending inward from and non-rotatable relative to the casing wall portion. The casing, wall portion is situated between and fixedly interconnects the impeller shell and the casing shell. The piston engagement portion has a first engagement surface. The turbine-piston includes a turbine-piston shell having a turbine-piston flange with a second engagement surface that is movable axially toward and away from the first engagement surface of the piston engagement portion. According to the method, the driving shaft and the driven shaft are operatively connected to input and output parts of the hydrokinetic torque coupling device. Axial movement of the turbine-piston flange is controlled to position the hydrokinetic torque coupling device respectively into and out of lockup mode in which the turbine-piston is mechanically locked with so as to be non-rotatable relative to the piston engagement portion of the casing.

Other aspects of the invention, including apparatus, devices, systems, coupling devices, converters, processes, and the like which constitute part of the invention, will become more apparent upon reading the following detailed description of the exemplary embodiments.

BRIEF DESCRIPTION OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein.

Figure 1:
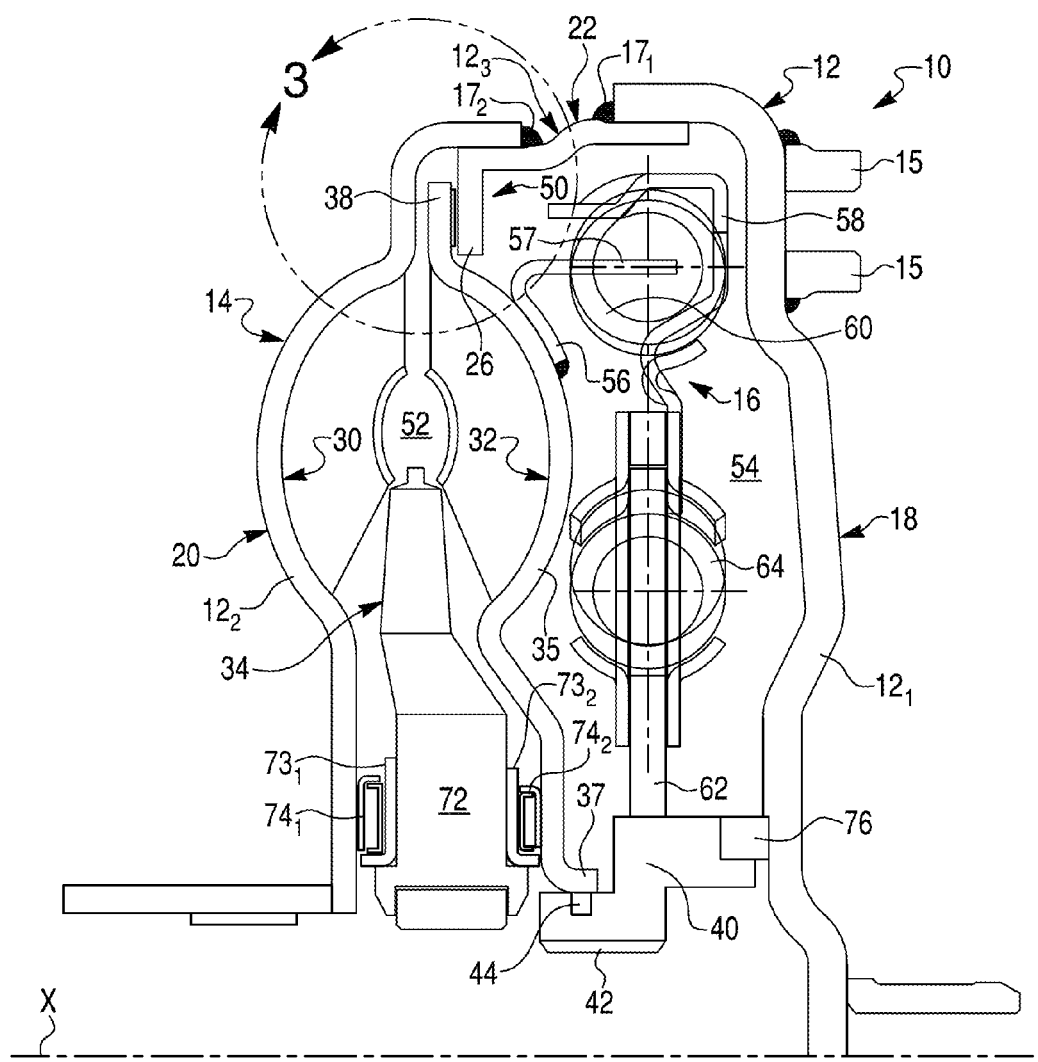
FIG. 1 is a fragmentary half view in axial cross section of a hydrokinetic torque coupling device equipped with a turbine-piston in accordance with an exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper," "lower," "right" "left," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the words "a" and "an" as used in the claims mean "at least one".

A first exemplary embodiment of a hydrokinetic torque coupling device is generally represented in FIG. 1 by reference numeral 10. The hydrokinetic torque coupling device 10 is operable to fluidly couple a driving shaft and a driven shaft of a motor vehicle, such as an automobile. In the typical case, the driving shaft is an output shaft of an internal combustion engine (not shown) of the motor vehicle and the driven shaft is connected to an automatic transmission of the motor vehicle.

The hydrokinetic torque coupling device 10 includes a sealed casing 12 filled with a fluid, such as oil or transmission fluid. The sealed casing 12, a hydrodynamic torque converter 14, and a torsional vibration damper (also referred to herein as a damper assembly) 16 are all rotatable about a rotational axis X. The drawings discussed herein show half-views, that is, the portion or fragment of the hydrokinetic torque coupling device 10 above rotational axis X. Generally, the device 10 is symmetrical about the rotational axis X. Herein, the axial and radial orientations are considered with respect to the rotational axis X of the hydrokinetic torque coupling device 10. The relative terms such as "axially," "radially," and "circumferentially" are with respect to orientations parallel to, perpendicular to, and circularly around the rotational axis X, respectively.

The sealed casing 12 according to the exemplary embodiment as illustrated in FIG. 1 includes a casing cover (or a first casing shell) 18, an impeller shell (or a second casing shell) 20 disposed coaxially with and axially opposite to the casing cover 18, and a substantially annular intermediate casing component 22 situated between the impeller shell 20 and the first casing shell 18. The first casing shell 18, the second casing shell 20 and the intermediate casing component 22 are non-movably (i.e., fixedly) connected sealingly together at their outer periphery, such as by welding, to form the sealed casing 12. Specifically, the casing cover/first casing shell 18 is fixedly connected to the intermediate casing component 22 at the outer periphery thereof, such as by welding at weld $17_1$, and the impeller shell 20 is fixedly connected to the intermediate casing component 22 at the outer periphery thereof, such as by welding at weld $17_2$.

The first casing shell 18 is non-movably (i.e., fixedly) interconnected to the driving shaft, more typically a flywheel (not shown) that is fixed to and non-rotatable relative to the driving shaft, so that the casing 12 turns at the same speed that the engine operates for transmitting torque. Specifically, in the illustrated embodiment of FIG. 1 the casing 12 is rotatably driven by the internal combustion engine and is non-rotatably coupled to the flywheel with studs 15, shown in FIG. 1. Each of the first casing shell 18, the impeller shell 20 and the intermediate casing component 22 may be made, for example, integrally by press-forming one-piece metal sheets.

Figure 2:
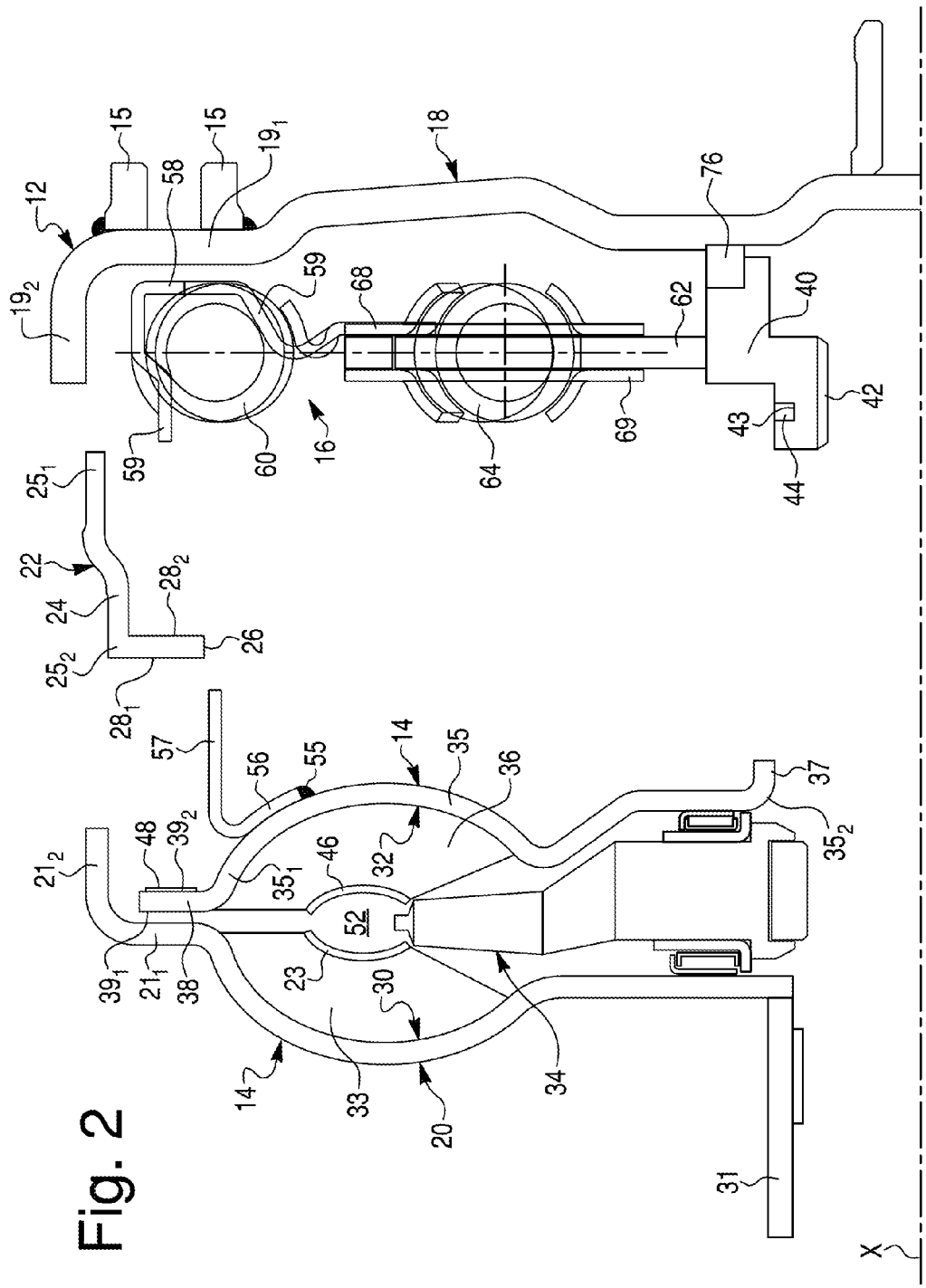
FIG. 2 is an exploded fragmentary half view in axial cross section of the hydrokinetic torque coupling device of FIG. 1.

As best shown in FIG. 2, the intermediate casing component 22 according to the exemplary embodiment includes a substantially cylindrical outer wall portion (also referred to herein as a casing, wall portion) 24 and a piston engagement portion 26 in the form of a radial flange extending radially inward from and non-rotatable relative to the outer wall portion 24 of the intermediate casing component 22. As best shown in FIG. 1, the piston engagement portion 26 is located radially outward of the torus, discussed below. The outer wall portion 24 of the intermediate casing component 22 has axially opposite first end and second ends $25_1$ and $25_2$. The first end $25_1$ is adjacent to and faces the first casing shell 18. The second end $25_2$ is adjacent to and faces the impeller shell/second casing shell 20.

The piston engagement portion 26 in the form of a substantially annular, planar (i.e., flat) flange extends radially inward from the second end $25_2$ of the outer wall portion 24 and is non-rotatable relative to the outer wall portion 24 of the intermediate casing component 22. Specifically, according to the exemplary embodiment, the outer wall portion 24 and the piston engagement portion 26 of the intermediate casing component 22 are made integrally with one another, for example, by press-forming the outer wall portion 24 and portion 26 from one piece, such as from sheet metal. Alternatively, the piston engagement portion 26 is non-movably (i.e., fixedly) connected to the outer wall portion 24 of the intermediate casing component 22, such as by welding. As best shown in FIG. 1, the piston engagement portion 26 interconnects the first and second casing shells 18, 20 of the casing 12.

Figure 3:
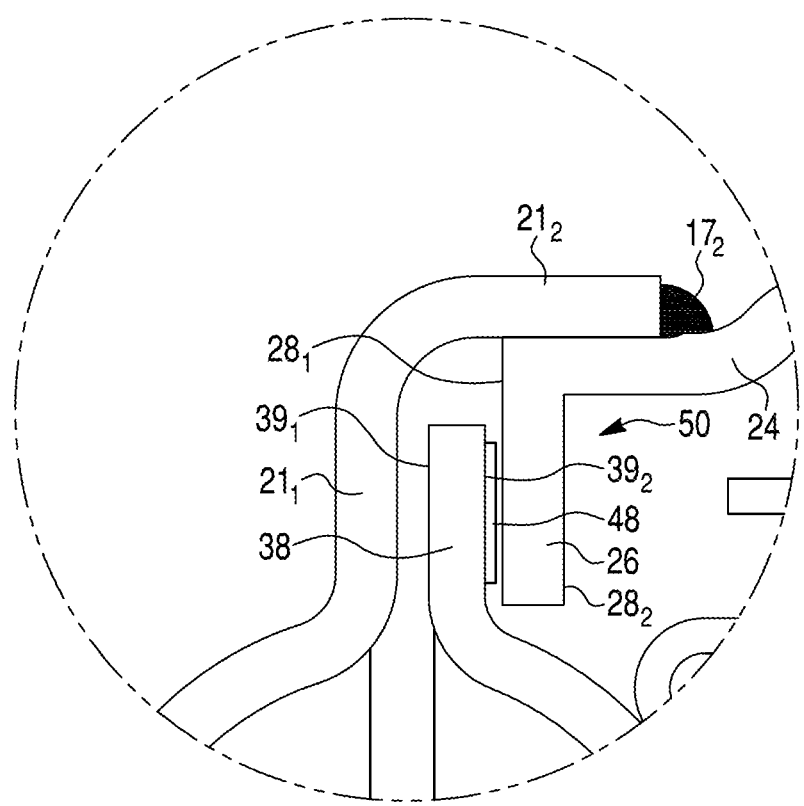
FIG. 3 is an enlarged fragmentary view of circle III of FIG. 1.

The piston engagement portion 26 of the intermediate casing component 22 has two axially opposite planar surfaces: a first (engagement) surface $28_1$ facing the second casing shell 20, and a second surface $28_2$ facing the first casing shell 18, as best shown in FIGS. 2 and 3.

The first casing shell 18 includes a first sidewall portion $19_1$ extending substantially radially relative to the direction from the rotational axis X (i.e., in a plane that is generally transverse to the rotational axis X) and a first outer flange portion $19_2$ extending substantially axially from the first sidewall portion $19_1$ toward the impeller shell 20. Similarly, the impeller shell 20 includes a second sidewall portion $21_1$ extending substantially radially relative to the direction from the rotational axis X and a second outer flange portion $21_2$ extending substantially axially from the second sidewall portion $21_1$ toward the first casing shell 18. The first and second outer flange portions $19_2$ and $21_2$ and the outer wall portion 24 of the intermediate casing component 22 collectively establish an annular outer easing wall $12_3$ extending substantially parallel to the rotation axis X. Distal ends of the first and second outer flange portions $19_2$ and $21_2$ are fixedly interconnected to one another by the outer wall portion 24 of the intermediate casing component 22, such as by welding at the welds $17_1$ and $17_2$, respectively. Specifically, the distal end of the first outer flange portion $19_2$ of the first casing shell 18 is fixedly connected to one end $25_1$ of the outer wall portion 24 of the intermediate casing component 22, while the distal end of the second outer flange portion $21_2$ of the impeller shell 20 is fixedly connected to another end $25_2$ of the outer wall portion 24 of the intermediate casing component 22.

The torque converter 14 includes an impeller (sometimes referred to as the pump or impeller wheel) 30, a turbine-piston 32, and a stator (sometimes referred to as the reactor) 34 interposed axially between the impeller 30 and the turbine-piston 32. The impeller 30, the turbine-piston 32, and the stator 34 are coaxially aligned with one another on the rotational axis X. The impeller 30, the turbine-piston 32, and the stator 34 collectively form a torus. The impeller 30 and the turbine-piston 32 may be fluidly (or hydrodynamically) coupled to one another as known in the art.

The second casing shell 20 of the casing 12 also forms and serves as the impeller shell of the impeller 30. Accordingly, the impeller shell 20 sometimes is referred to as part of the casing 12. The impeller 30 flintier includes a core ring 23, and a plurality of impeller blades 33 fixedly attached, such as by brazing, to the impeller shell 20 and the core ring 23. The impeller 30, including its shell 20, the core ring 23, and the blades 33, is fixedly secured to so as to be non-rotatable relative to the first casing shell 18 and the drive shaft (or flywheel) of the engine to rotate at the same speed as the engine output. The impeller 30 also includes an impeller hub 31 fixedly secured to the impeller shell 20. The impeller hub 31 is arranged for engagement with a hydraulic pump of the transmission.

The torque coupling device 10 further includes a hub (also referred to as an output hub) 40 that is rotatable about the rotational axis X. The output hub 40 is operatively coupled to and coaxial with the driven shaft. For example, the output hub 40 may be provided with internal splines 42 for non-rotatably coupling the output hub 40 to the driven shaft, such as a transmission input shaft, provided with complementary external splines or grooves. Alternatively, a weld or other connection may be used to fix the output hub 40 to the driven shaft. A radially outer surface of the output hub 40 includes an annular slot 43 for receiving a sealing member, such as an O-ring 44. A sealing member mounted to a radially inner peripheral surface of the output hub 40 may be included to create a seal at the interface of a transmission input shaft and the output hub 40.

The turbine-piston 32 is a consolidation or incorporation of a turbine with a lockup clutch piston. The turbine component of the turbine-piston 32 includes a turbine-piston shell 35, a core ring 46, and a plurality of turbine blades 36 fixedly attached, such as by brazing, to the turbine-piston shell 35 and the core ring 46. The spinning of the impeller 30 causes transmission fluid in the torus to spin the turbine blades 36, and hence the turbine-piston shell 35. The impeller shell 20 and the turbine-piston shell 35 collectively define a substantially toroidal inner chamber (or torus chamber) 52 therebetween.

Extending axially at a radially inner peripheral end $35_2$ of the turbine-piston shell 35 is a substantially cylindrical flange 37 that is proximate to the rotational axis X. The substantially cylindrical flange 37 of the turbine-piston 32 is rotatable relative to the output hub 40. The sealing member (e.g., O-ring) 44 creates a seal at the interface of the substantially cylindrical flange 37 and the output hub 40. As discussed in further detail below, the turbine-piston 32 is axially movably relative to the hub 40 along this interface.

The piston component of the turbine-piston 32 includes a substantially annular, planar (i.e., flat) turbine-piston flange (or turbine-piston wall) 38. The turbine-piston flange 38 is distal to the rotational axis X relative to the above-discussed proximal flange 37. The turbine-piston flange 38 is a radial extension of the turbine-piston shell 35 and, as illustrated in FIG. 1, is disposed radially outside of the turbine blades 36. The turbine-piston flange 38 and the turbine-piston shell 35 are embodied as integral with one another, e.g., made of a single or unitary component, but may be separate components connected together. The turbine-piston flange 38 extends from a radially outer peripheral end $35_1$ of the turbine-piston shell 35 radially outward to terminate at an end in spaced relationship to the inner peripheral surface of the annular outer casing wall $12_3$ of the casing 12. As best shown in FIG. 1, the turbine-piston flange 38 is axially interposed between and radially extends outward into a gap between the second sidewall portion $21_1$ and the piston engagement portion 26.

Returning to FIGS. 2 and 3, the turbine-piston flange 38 has a first surface $39_1$ facing the second sidewall portion $21_1$ and an opposite second engagement surface $39_2$ facing the first engagement surface $28_1$ of the piston engagement portion 26. The first and second engagement surfaces $28_1$ and $39_2$ are parallel to and face one another, and extend radially at a 90 degree angle relative to the rotational axis X. The second engagement surface $39_2$ faces and, as explained below, is movable axially toward and away from the first engagement surface $28_1$ to position the coupling device 10 into and out of a lockup mode, respectively.

In accordance with the exemplary embodiment, the second engagement surface $39_2$ is provided with a friction ring (or friction lining) 48, best shown in FIG. 2. The friction ring 48 may be secured to the second engagement surface $39_2$, for example, by adhesive bonding and/or with fasteners. The friction ring 48 is made of a friction material for improved frictional performance. Alternatively, a friction ring (or friction lining) may be secured to the first engagement surface $28_1$. According to still another embodiment, a first friction ring or liner is secured to the first engagement surface $28_1$ of the casing 12 and a second friction ring or liner is secured to the second (engagement) surface $39_2$. It is within the scope of the invention to omit one or both of the friction rings.

The stator 34 is positioned between the impeller 30 and turbine-piston 32 to redirect fluid from the turbine-piston 32 hack to the impeller 30 in an efficient manner. The stator 34 is typically mounted on a one-way clutch 72 to prevent the stator 34 from counter-rotation. A first thrust bearing $74_1$ is interposed between a first side bearing ring $73_1$ of the stator 34 and the impeller shell 20 of the casing 12, while a second thrust bearing $74_2$ is interposed between a second side bearing ring $73_2$ of the stator 34 and the turbine-piston shell 35.

In the lockup mode, the first and second engagement surfaces $28_1$ and $39_2$ (or friction ring(s) 48 secured thereto) are pressed together such that the turbine-piston flange 38 is frictionally non-rotatably coupled to the piston engagement portion 26, thereby mechanically locking the turbine-piston 32 and the casing 12 in a lockup mode. When not in the lockup mode, the first and second engagement surfaces $28_1$ and $39_2$ are spaced from one another, such that the turbine-piston flange 38 is not frictionally non-rotatably coupled to the piston engagement portion 26 of the easing 12. In non-lockup mode, normal operation of the torque converter 14 selectively fluidly couples and decouples the impeller 30 to the turbine-piston 32.

The torsional vibration damper 16 is housed in the casing 12 axially between, on one side, the turbine-piston 32 and the piston engagement portion 26, and on the other side the first casing shell 18, as shown in FIG. 1. The torsional vibration damper 16 is connected to a drive (or input) member 56 (discussed below), and includes a plurality of first (or radially outer) circumferential elastic damping members 60, an intermediate member 58 drivenly coupled to the drive member 56 through the first circumferential damping members 60, a plurality of second (or radially inner) circumferential elastic damping members 64, and a driven (or output) member 62 drivenly coupled to the intermediate member 58 through the second circumferential damping members 64. The first circumferential damping members 60 are situated radially outward from the second circumferential damping members 64. According to the exemplary embodiment of FIG. 1 and other embodiments discussed herein, the first and second damping members 60, 64 are configured as helical (or coil) springs having a principal axis oriented substantially circumferentially. Other elastic members may be selected to replace or supplement the springs.

The drive member 56 is fixedly connected to the turbine-piston shell 35 of the turbine-piston 32, such as by weld 55. The output side of the drive member 56 has a plurality of driving tabs 57 (FIG. 2) extending axially in the direction away from the turbine-piston 32. The driving tabs 57 of the drive member 56 are circumferentially equidistantly spaced from one another, and engage first circumferential ends of the first damping members 60.

The intermediate member 58 has a plurality of driven tabs 59 extending axially in an opposite direction to the driving tabs 57 of the drive member 56. The driven tabs 59 of the intermediate member 58 are circumferentially equidistantly spaced from one another, and engage the opposite second circumferential ends of the first damping members 60 than the driving tabs 57. The intermediate member 58 of the damper assembly 16 is rotatable relative to the drive member 56 and its driving tabs 57 due to elasticity of the first damping members 60, which absorb torsional vibration.

Additionally, the driving tabs 57 of the drive member 56 are axially movable relative to the driven tabs 59 of the intermediate member 58. This relative axial movement between the driving tabs 57 and the driven tabs 59 may become necessary during, axial movement of the turbine-piston 32 between its lockup and non-lockup modes. As discussed in greater detail below, when the turbine-piston shell 35 shifts axially due to a lockup event, the driving tabs 57 move axially relative to the driven tabs 59. Thus, the drive member 56 is both axially and circumferentially moveable relative to the intermediate member 58, and generally to the damping assembly 16.

The radially inner portion of the intermediate member 58 forms or is connected to a first disk part 68 on a first side of the second damping members 64. The first disk part 68 is non-moveably secured to a second disk part 69 on the opposite side of the second damping members 64, such as by rivets or welding. The first and second disk parts 68, 69 establish an input part to the second damping members 64.

The driven member 62 establishes an output part of the second damping members 64. The driven member 62 has windows in which the second damping members 64 are set. The disk parts 68, 69 engage first ends of the second damping members 64, and the driven member 62 engages second ends of the second damping members 64. The disk parts 68, 69 of the intermediate member 58 are thus rotatable relative to the driven member 62, with the second damping members 64 absorbing torsional vibration due to their elasticity.

The driven member 62 is non-rotatably connected, e.g., fixed, to the output hub 40. The non-rotatable connection between the driven member 62 and the output hub 40 may be formed by splines or welding. Alternatively, the output hub 40 and driven member 62 may be integral with one another. A thrust bearing 76 is positioned between the output hub 40 and the first casing shell 18.

As discussed above, the turbine-piston 32 is axially movable toward and away from the impeller shell 20 between a lockup position and an open (non-lockup) position. Axial movement of the turbine-piston 32 is accomplished by changing the pressure differential between the opposite sides of the turbine-piston shell 35. Referring to FIG. 1, a torus chamber 52 is to the left side of the turbine-piston shell 35, and a damper chamber 54 is to the other (right) side of the turbine-piston shell 35. A pressure increase in the damper chamber 54 relative to the torus chamber 52 (or stated differently a pressure decrease in the torus chamber 52 relative to the damper chamber 54) shifts the turbine-piston flange 38 axially in the direction of torque transmission, i.e., towards the output side of the casing 12, that is right to left in FIG. 1 away from lockup mode. On the other hand, a pressure decrease in the damper chamber 54 relative to the torus chamber 52 (or stated differently a pressure increase in the torus chamber 52 relative to the damper chamber 54) shifts the turbine-piston flange 38 against the direction of torque transmission, i.e., towards the input side of the casing, that is left to right in FIG. 1, into lockup mode.

In the lockup mode, the turbine-piston shell 35 is displaced axially away from the impeller 30 until the frictional ring 48 of the second engagement surface $39_2$ of the turbine-piston flange 38 (which moves axially with the turbine-piston shell 35) abuts against and is non-rotatably frictionally coupled to the first engagement surface $28_1$. Torque is transferred from the engine to the casing 12, then by way of the frictional engagement between surfaces $28_1$ and $39_2$ (or frictional lining 48 thereof) to the locked-up piston engagement portion 26 and turbine-piston 32, then serially to the driving member 56, the damping assembly 16 and the output hub 40. Thereby, the lockup clutch bypasses the hydrodynamic fluid coupling of the torque converter 14 and mechanically couples the driving and driven shafts. Notably, the friction ring 48 secured to the second engagement surface $39_2$ may have a plurality of circumferentially spaced grooves (not shown) extending generally radially so as to fluidly connect the torus chamber 52 and the damper chamber 54 with one another in the lockup mode for cooling friction surfaces of the lockup clutch 50 by the working fluid.

In the non-lockup position, the turbine-piston 32 is displaced axially towards the impeller 30, axially moving the turbine-piston flange 38 until the frictional ring 48 of the second engagement surface $39_2$ (or the frictional lining 48 thereof) is spaced from and no longer non-rotatably frictionally coupled to the first engagement surface $28_1$. Thus, torque transferred from the engine to the casing 12 in a hydrodynamic transmission mode that does not bypass the torque converter 14 through the lockup clutch 50. The torque is transferred serially from the casing 12, including the impeller shell 20, through the hydrodynamic coupling of the torque converter 14, to the drive member 56 and its driving tabs 57, to the damping assembly 16, and to the output hub 40. Notably, in the non-lockup position an open serpentine passage is established between the second sidewall portion $21_1$, the turbine-piston flange 38, and the piston engagement portion 26, allowing hydraulic fluid to flow between the torus chamber 52 and the damper chamber 54 through the serpentine passage.

Torque received by the locked-up clutch is transmitted through the torsional vibration damper 16 to the output hub 40, which is connected to the driven shaft, for example by splines 42. As the turbine-piston 32 moves axially into and out of lockup position as described above, the driving tabs 57 of the drive member 56 are axially displaced relative to the driven tabs 59 of the intermediate member 58. The axial movement of the driving tabs 57 relative to the driven tabs 59 allows the intermediate member 58, the driven member 62, and the damping members 60, 64 to remain fixed axially on the output hub 40 while the turbine-piston 32 moves in the axial direction.

In operation, the lockup clutch 50 is generally activated, after the hydrodynamic coupling of the driving and driven shafts, typically at relatively constant speeds, in order to avoid the loss of efficiency caused in particular by slip phenomena between the turbine-piston 32 and the impeller 30. Because of the axial pressures acting on the turbine-piston 32 for movement between its lockup and non-lockup positions, the turbine-piston shell 35 may be made somewhat thicker than typical turbine shells that do not form or function as the lockup piston. Although not shown, a biasing member, such as a spring (e.g., a washer spring), may be included in the hydrokinetic torque coupling device 10 to urge the turbine-piston 32 into or out of lockup mode.

The turbine-piston 32 both forms the shell component of the turbine and the piston component of the lockup clutch 50, as described above. By consolidating two components that are normally separate from one another into a single component, space is saved in the hydrokinetic torque coupling device 10. This space-saving structure provides several design options. For example, the hydrokinetic torque coupling device 10 can be made smaller and lighter. Alternatively, the free space within the casing 12 can be used to add additional components such as damping components.

The features of the above-described embodiments may be practiced with one another and are substitutable in numerous combinations. Additionally, various modifications, substitutions, and other changes may be practiced. For example, the damper assembly 16 may include only a single set of damping members 60 or 64. Other examples of modifications are described above or will be understood by those skilled in the art having reference to this disclosure.

Figure 4:
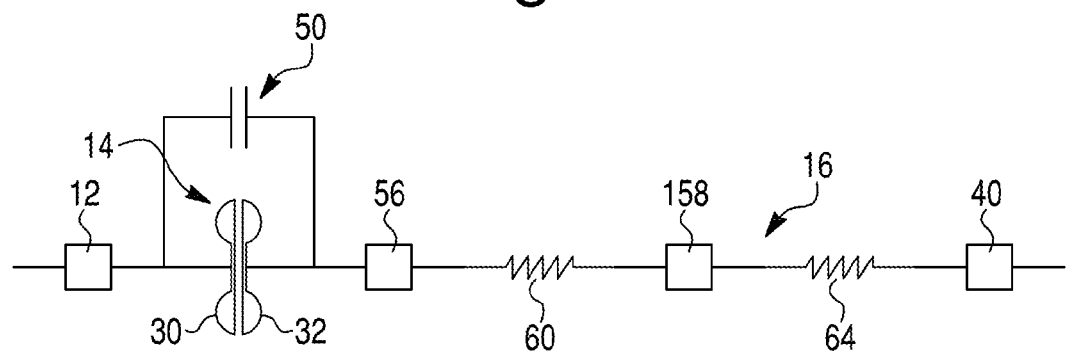
FIG. 4 is a simplified diagram of a hydrodynamic torque coupling device including a turbine-piston with a dual or double damper assembly.

The torque converters and hydrodynamic torque coupling devices described herein may incorporate different damper assemblies. For example, FIG. 4 shows a hydrodynamic torque coupling devices including the impeller 30 and the turbine-piston 32 for establishing the hydrodynamic transmission mode and the lockup clutch 50 for lockup mode transmission. The impeller 30/turbine-piston 32 combination and the lockup clutch 50 are arranged parallel to one another and serially between the casing 12 and the turbine-piston shell 35. The elastic damping members 60 and 64 of the damper assembly 16 and the output hub 40 are arranged serially downstream of the turbine-piston shell 35 in FIG. 4. The diagram of FIG. 4 generally corresponds to the arrangement of the embodiments shown in FIGS. 1-3.

Figure 5:
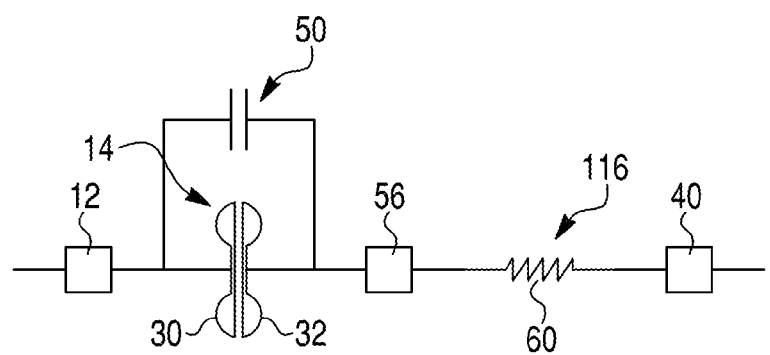
FIG. 5 is a simplified diagram of another hydrodynamic torque coupling device including a turbine-piston with a single damper assembly.

FIG. 5 shows an alternative damper assembly 116 similar to that of FIG. 4, but in which the damper assembly 116 is modified to include only one set of circumferentially extending elastic damping members 60.

Figure 6:
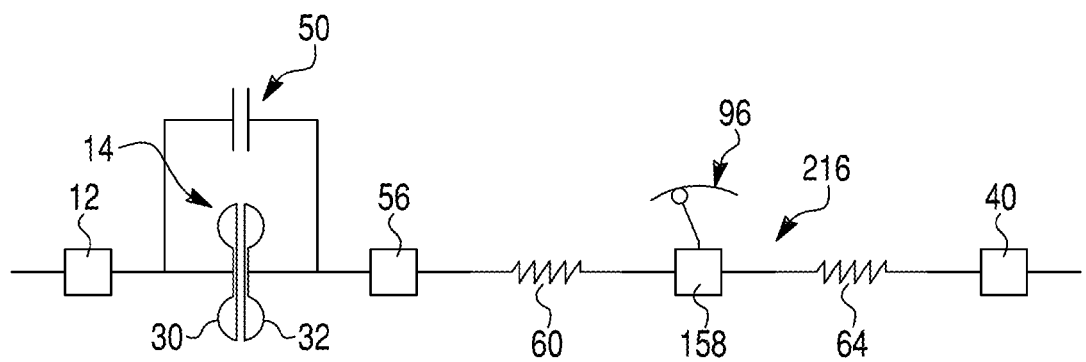
FIG. 6 is a simplified diagram of still another hydrodynamic torque coupling device including a turbine-piston with dual or double damper assemblies and a pendulum vibration absorber.

A damper assembly 216 shown in FIG. 6 is similar to that of FIG. 4, but further includes a centrifugal pendulum oscillator 96 coupled to the intermediate member 58. Centrifugal pendulum oscillators (or pendulum vibration absorbers) are well known in the art and described in, for example, U.S. patent application Ser. No. 14/305,128 filed Jun. 16, 2014, GB598811 to Stone, U.S. Pat. No. 6,026,940 to Sudau, and EP1744074 to Grahl. The centrifugal pendulum oscillator 96 may be coupled to the circumference of the intermediate member 58 and may be arranged on both sides of the intermediate member 58.

Figure 7:
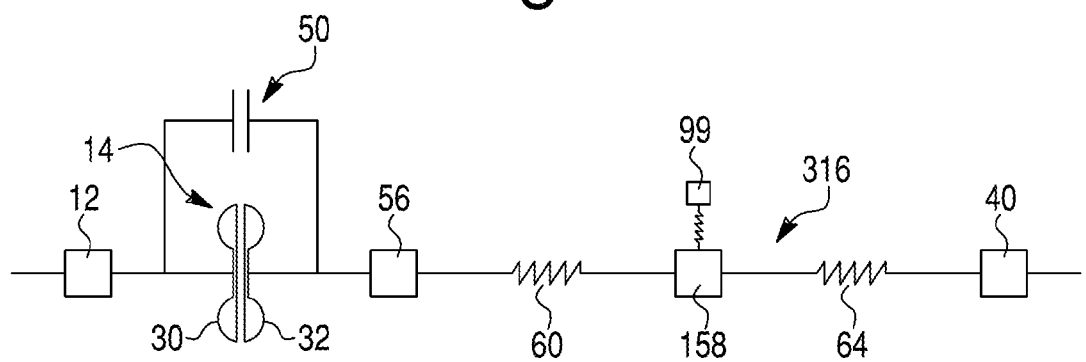
FIG. 7 is a simplified diagram of a further hydrodynamic torque coupling device including a turbine-piston with dual or double damper assemblies and a vibration absorbing spring-mass system.

A damper assembly 316 shown in FIG. 7 is similar to that of FIG. 4, but further includes a spring mass system 99 coupled to the intermediate member 58. Spring-mass systems are well known in the art and described in, for example, WO 2004/018897 to Haller. The spring-mass system 99 may be coupled to the circumference of the intermediate member 58. The spring of the spring-mass system 99 may be a coil spring, such as a steel spring. The damper may be any linear or non-linear damper, including for example a viscous damper. The spring and mass may be embodied as two components or one integral component. The spring-mass system may have a linear or non-linear constant or variable stiffness, and a constant or variable mass.

The features of the above-described embodiments are substitutable in numerous combinations.

An exemplary method for assembling the hydrokinetic torque coupling device 10 according to the embodiment of FIGS. 1 and 2 will now be explained. While the method for assembling the hydrokinetic torque coupling device 10 may be practiced by sequentially performing the steps as set forth below, it should be understood that the method may involve performing the steps in different sequences. It should be understood that this exemplary method may be practiced in connection with the other embodiments described herein. The exemplary methods described herein are not the exclusive methods for assembling the hydrokinetic torque coupling devices described herein.

The impeller 30, the turbine-piston 32, the stator 34, and the damper 16 may each be preassembled. The turbine-piston 32 includes, as noted above, the turbine-piston shell 35, the turbine blades 36 attached to the turbine-piston shell 35, and the annular, planar turbine-piston flange 38 extending radially outwardly from the turbine-piston shell 35.

The stator 34 and the turbine-piston 32 am combined with the impeller 30 so as to be mounted to the impeller shell 20. The intermediate casing component 22 is non-moveably secured, such as by welding at the weld $17_2$, to the second outer flange portion $21_2$ of the impeller shell 20 so that the frictional ring 48 on the second engagement surface $39_2$ of the turbine-piston flange 38 faces the first engagement surface 28₁ of the piston engagement portion 26, and also so that the turbine-piston flange 38 is disposed between the second sidewall portion 21₁ of the impeller shell 20 and the piston engagement portion 26 of the intermediate casing component 22. The drive member 56 of the torsional vibration damper 16 is fixedly secured, such as by welding at 55, to the turbine-piston shell 35. The cylindrical flange 37 of the turbine-piston 32 is mourned on the output hub 40, which may be pre-mounted on the driven shaft, to slidingly engage the output hub 40 through the seal 44. The driven member 62 of the torsional vibration damper 16 is fixedly secured, such as by welding or splining, to the output hub 40. Then, the first casing shell 18 is non-moveably and sealingly secured, such as by welding at 17₁, to the intermediate casing component 22, as best shown in FIG. 1, so that the intermediate casing component 22 is disposed between and fixedly connecting the impeller shell 20 and the first casing shell 18.

The use of the intermediate casing component 22 simplifies assembly of the torque coupling device 10. The intermediate casing component 22 is not initially fixed by weld 17₁ to the first casing shell 18, allowing for assembly of the torque convener 14. Accordingly, the intermediate casing component 22 may be affixed by weld 17₂ to the second casing shell 20 to properly position the piston engagement portion 26 in relation to the turbine-piston flange 38. The damper assembly 16 may then be mounted without interference from the first casing shell 18, which is yet to be affixed to the intermediate casing component 22. After the intermediate casing component 22 and the damper assembly 16 are installed and tuned, the first casing shell 18 may be affixed to the intermediate casing component 22 at weld 17₁.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque coupling device for coupling together a driving shaft and a driven shaft, comprising:
    a casing rotatable about a rotational axis, the casing comprising an impeller shell, a casing shell situated axially opposite the impeller shell, and an intermediate casing component, the intermediate casing component comprising a casing wall portion and a piston engagement portion extending inward from and being non-rotatable relative to the casing wall portion, the casing wall portion being situated between and fixedly interconnecting the impeller shell and the casing shell, the piston engagement portion having a first engagement surface;
    an impeller coaxially aligned with the rotational axis and comprising the impeller shell; and
    a turbine-piston coaxially aligned with and hydrodynamically drivable by the impeller, the turbine-piston comprising a turbine-piston shell including a turbine-piston flange having a second engagement surface that is movable axially toward and away from the first engagement surface of the piston engagement portion to position the hydrokinetic torque coupling device respectively into and out of a lockup mode in which the turbine-piston is mechanically locked with so as to be non-rotatable relative to the piston engagement portion of the casing.

2. The hydrokinetic torque coupling device of claim 1, wherein the casing wall portion is substantially cylindrical.

3. The hydrokinetic torque coupling device of claim 1, wherein the casing wall portion and the piston engagement portion are integral with one another.

4. The hydrokinetic torque coupling device of claim 1, wherein the casing wall portion includes a first axial end affixed to a distal end of the casing shell and an opposite second axial end affixed to a distal end of the impeller shell.

5. The hydrokinetic torque coupling device of claim 4, wherein the distal ends of the casing shell and the impeller shell are axially spaced from one another.

6. The hydrokinetic torque coupling device of claim 1, wherein the casing wall portion extends axially to establish a cylindrical shape, and wherein the piston engagement portion extends transversely to the rotational axis.

7. The hydrokinetic torque coupling device of claim 1, wherein:
    the casing wall portion and the piston engagement portion are integral with one another;
    the casing wall portion includes a first axial end affixed to a distal end of the casing shell and an opposite second axial end affixed to a distal end of the impeller shell;
    the distal ends of the casing shell and the impeller shell are axially spaced from one another; and
    the casing wall portion extends axially to establish a cylindrical shape, and wherein the piston engagement portion extends transversely to the rotational axis.

8. The hydrokinetic torque coupling device of claim 7, wherein the turbine-piston flange is axially interposed between the piston engagement portion and the impeller shell.

9. The hydrokinetic torque coupling device of claim 1, wherein the turbine-piston flange is axially interposed between the piston engagement portion and the impeller shell.

10. The hydrokinetic torque coupling device of claim 1, further comprising a frictional lining secured to the first engagement surface of the piston engagement portion or the second engagement surface of the turbine-piston flange.

11. The hydrokinetic torque coupling device of claim 1, wherein the turbine-piston shell and the turbine-piston flange are axially movable towards an input side of the hydrokinetic torque coupling device in order to frictionally couple the first and second engagement surfaces and position the hydrokinetic torque coupling device in the lockup mode, and wherein the turbine-piston shell and the turbine-piston flange are axially movable towards an output side of the hydrokinetic torque coupling device so that the first and second engagement surfaces are not frictionally coupled and the hydrokinetic torque coupling device is not in the lockup mode.

12. The hydrokinetic torque coupling device of claim 1, further comprising:

an output hub; and
a damper assembly interconnecting the turbine-piston shell and the output hub.

13. The hydrokinetic torque coupling device of claim 12, further comprising a driving member interconnecting the turbine-piston shell to the damper assembly, the driving member being axially and rotatably fixed relative to the turbine-piston shell and axially movable relative to the damper assembly.

14. The hydrokinetic torque coupling device of claim 12, wherein the turbine-piston shell partitions an interior volume of the hydrokinetic torque coupling device into a torus chamber and a damper chamber, the torus chamber containing the impeller blades and the turbine blades, the damper chamber containing the damper assembly.

15. The hydrokinetic torque coupling device of claim 14, wherein out of the lockup mode, the first and second engagement surfaces provide a passage between the torus chamber and the damper chamber to allow a fluid flow therebetween.

16. The hydrokinetic torque coupling device of claim 12, wherein:
the casing wall portion and the piston engagement portion are integral with one another;
the casing wall portion includes a first axial end affixed to a distal end of the casing shell and an opposite second axial end affixed to a distal end of the impeller shell;
the distal ends of the casing shell and the impeller shell are axially spaced from one another; and
the casing wall portion extends axially to establish a cylindrical shape, and wherein the piston engagement portion extends transversely to the rotational axis.

17. The hydrokinetic torque coupling device of claim 12, further comprising a driving member interconnecting the turbine-piston shell to the damper assembly, wherein the damper assembly comprises an intermediate member, a first set of circumferentially extending elastic damping members drivingly coupling the drive member to the intermediate member, a driven member connected to and non-rotatable relative to the output hub, a second set of circumferentially extending elastic damping members drivingly coupling the intermediate member to the driven member, and a centrifugal pendulum oscillator mounted to the intermediate member.

18. The hydrokinetic torque coupling device of claim 12, further comprising a driving member interconnecting the turbine-piston shell to the damper assembly wherein the damper assembly comprises an intermediate member, a first set of circumferentially extending elastic damping members drivingly coupling the drive member to the intermediate member, a driven member connected to and non-rotatable relative to the output hub, a second set of circumferentially extending elastic damping members drivingly coupling the intermediate member to the driven member, and a sprint mass system coupled to the intermediate member.

19. A method of assembling a hydrokinetic torque coupling device for coupling a driving shaft and a driven shaft together, comprising:
providing a torque converter rotatable about a rotational axis, the torque converter comprising an impeller and a turbine-piston, the impeller comprising an impeller shell, the turbine-piston comprising a turbine-piston shell including an axially movable turbine-piston flange;
connecting the impeller shell of the torque converter with and non-rotatably relative to an intermediate casing component comprising a casing wall portion and a piston engagement portion having a first engagement surface to provide a structure in which the turbine-piston flange has a second engagement surface that is movable axially toward and away from the first engagement surface of the piston engagement portion of the intermediate casing component to position the hydrokinetic torque coupling device respectively into and out of a lockup mode in which the turbine-piston is mechanically locked with so as to be non-rotatable relative to the piston engagement portion of the intermediate casing component; and
connecting a casing shell with and non-rotatably relative to the intermediate casing component.

20. A method of coupling a driving shaft and a driven shaft together with a hydrokinetic torque coupling device, the hydrokinetic torque coupling device comprising a casing rotatable about a rotational axis, an impeller coaxially aligned with the rotational axis and comprising an impeller shell, and a turbine-piston coaxially aligned with and hydrodynamically drivable by the impeller, the casing comprising the impeller shell, a casing shell situated axially opposite the impeller shell, and an intermediate casing component comprising a casing wall portion and a piston engagement portion extending inward from and non-rotatable relative to the casing wall portion, the casing wall portion being situated between and fixedly interconnecting the impeller shell and the casing shell, the piston engagement portion having a first engagement surface, the turbine-piston comprising a turbine-piston shell including a turbine-piston flange having a second engagement surface that is movable axially toward and away from the first engagement surface of the piston engagement portion, the method comprising:
operatively connecting the driving shaft and the driven shaft to input and output parts of the hydrokinetic torque coupling device; and
controlling axial movement of the turbine-piston flange to position the hydrokinetic torque coupling device respectively into and out of a lockup mode in which the turbine-piston is mechanically locked with so as to be non-rotatable relative to the piston engagement portion of the casing.

* * * * *